United States Patent
Madden et al.

(10) Patent No.: US 6,874,232 B2
(45) Date of Patent: Apr. 5, 2005

(54) METHOD FOR FORMING COVER FOR INDUSTRIAL ROLL

(75) Inventors: Michael D. Madden, Winchester, VA (US); Matthew T. Vosika, Middletown, VA (US)

(73) Assignee: Stowe Woodward, LLC, Middletown, VA (US)

(*) Notice: Subject to any disclaimer, the term of this patent is extended or adjusted under 35 U.S.C. 154(b) by 49 days.

(21) Appl. No.: 10/441,636

(22) Filed: May 21, 2003

(65) Prior Publication Data
US 2004/0235630 A1 Nov. 25, 2004

(51) Int. Cl.⁷ ................................................ B21K 1/02
(52) U.S. Cl. ............................................. 29/895.211
(58) Field of Search ..................... 29/895.211, 893.3, 29/893.35, 893.36, 893.33, 893.31, 893, 29/464, 467; 492/48, 49, 43, 44, 35, 56; 101/375; 409/51, 10, 61, 12, 26; 475/342

(56) References Cited

U.S. PATENT DOCUMENTS

| | | | |
|---|---|---|---|
| 1,384,806 A | 7/1921 | Reed | |
| 1,993,718 A | 3/1935 | Miner | |
| 2,597,858 A | 5/1952 | Freedlander | |
| 3,184,828 A | 5/1965 | Dames, Jr. | |
| 3,445,906 A * | 5/1969 | Mitchell | 492/44 |
| 3,562,883 A | 2/1971 | Kobayashi | |
| 3,646,652 A | 3/1972 | Heiligenthal et al. | |
| 3,800,381 A | 4/1974 | Brafford | |
| 3,877,919 A | 4/1975 | Shorr | |
| 3,962,911 A | 6/1976 | Grenlund | |
| 4,016,756 A | 4/1977 | Kunkle | |
| 4,064,313 A | 12/1977 | Takiguchi et al. | |
| 4,178,664 A | 12/1979 | McLoughlin | |
| 4,233,011 A | 11/1980 | Bolender et al. | |
| 4,258,089 A | 3/1981 | Anderson et al. | |
| 4,288,058 A | 9/1981 | Inman | |
| 4,309,803 A | 1/1982 | Blaszak | |

(Continued)

FOREIGN PATENT DOCUMENTS

DE 37 29 269 3/1968

(Continued)

OTHER PUBLICATIONS

Watanabe; *Method for Producing a Hardened Roller*, Japan Patent Office, Patent Announcement Hei 3-47359, Application SHO 62-335378, Dec. 30, 1987, Disclosure Announcement Hei 1-260092 Oct. 17, 1989.

(Continued)

Primary Examiner—Eric Compton
(74) Attorney, Agent, or Firm—Myers Bigel Sibley & Sajovec (57) ABSTRACT

A process for forming a cover for an industrial roll includes the steps of: providing an elongate cylindrical core having a longitudinal axis; rotating the core about the longitudinal axis; providing a nozzle movable along a nozzle path that is substantially parallel to and above the core longitudinal axis, the nozzle having at least an upstream outlet and a downstream outlet, the nozzle outlets being longitudinally offset a distance from each other; and applying multiple strips of polymeric material to the core through the nozzle outlets as the nozzle moves along the nozzle path such that the downstream strip forms an overlapping spiral inner layer and the upstream strip forms an overlapping spiral outer layer that overlies the inner layer, the inner and outer layers being adhered with the core.

23 Claims, 5 Drawing Sheets

U.S. PATENT DOCUMENTS

| | | |
|---|---|---|
| 4,366,025 A | 12/1982 | Gordon, Jr. et al. |
| 4,368,568 A | 1/1983 | Watanabe |
| 4,509,237 A | 4/1985 | Volz et al. |
| 4,551,894 A | 11/1985 | Beucker |
| 4,576,845 A | 3/1986 | Krotchko |
| 4,705,711 A | 11/1987 | Perna |
| 4,729,153 A | 3/1988 | Pav et al. |
| 4,760,232 A | 7/1988 | Smith |
| 4,829,931 A | 5/1989 | Mogi |
| 4,842,944 A | 6/1989 | Kuge et al. |
| 4,871,908 A | 10/1989 | Skuratovsky et al. |
| 4,887,340 A | 12/1989 | Kato et al. |
| 4,898,012 A | 2/1990 | Jones et al. |
| 4,903,597 A | 2/1990 | Hoage et al. |
| 4,910,985 A | 3/1990 | Ballyns |
| 4,938,045 A | 7/1990 | Rosenstock et al. |
| 4,998,333 A | 3/1991 | Skytta |
| 5,014,406 A | 5/1991 | Kato et al. |
| 5,023,985 A | 6/1991 | Salo et al. |
| 5,048,353 A | 9/1991 | Justus et al. |
| 5,091,027 A | 2/1992 | Watanabe |
| 5,138,766 A | 8/1992 | Kimura et al. |
| 5,167,068 A | 12/1992 | Leino et al. |
| 5,217,532 A | 6/1993 | Sasame et al. |
| 5,235,747 A | 8/1993 | Leino et al. |
| 5,253,027 A | 10/1993 | Goto |
| 5,294,909 A | 3/1994 | Frazier |
| 5,301,610 A * | 4/1994 | McConnell ............... 101/401.1 |
| 5,376,448 A | 12/1994 | Suzuki et al. |
| 5,379,652 A | 1/1995 | Allonen |
| 5,383,371 A | 1/1995 | Laitinen |
| 5,403,995 A | 4/1995 | Kishino et al. |
| 5,412,870 A | 5/1995 | Lehtonen |
| 5,415,612 A | 5/1995 | Carlson et al. |
| 5,435,054 A | 7/1995 | Tonder et al. |
| 5,466,343 A | 11/1995 | Kankaanpaa |
| 5,505,492 A | 4/1996 | Nelson et al. |
| 5,520,600 A | 5/1996 | Fukumoto |
| 5,553,381 A | 9/1996 | Lehtonen |
| 5,555,932 A | 9/1996 | Dudley |
| 5,562,027 A | 10/1996 | Moore |
| 5,601,920 A | 2/1997 | Paasonen et al. |
| 5,684,912 A | 11/1997 | Slaney et al. |
| 5,709,765 A | 1/1998 | Herbert et al. |
| 5,742,880 A | 4/1998 | Takenaka et al. |
| 5,761,801 A | 6/1998 | Gebhardt et al. |
| 5,763,068 A | 6/1998 | Kishino et al. |
| 5,780,131 A | 7/1998 | Paasonen et al. |
| 5,797,322 A | 8/1998 | Lorig et al. |
| 5,857,950 A | 1/1999 | Hycner |
| 5,860,360 A | 1/1999 | Lane, III et al. |
| 5,915,648 A | 6/1999 | Madrzak et al. |
| 5,925,220 A | 7/1999 | Hirsch et al. |
| 6,080,258 A * | 6/2000 | Tittgemeyer ................ 156/192 |
| 6,159,134 A * | 12/2000 | Sekar .......................... 492/13 |
| 6,231,711 B1 * | 5/2001 | Roberts et al. ............. 156/188 |
| 6,257,140 B1 * | 7/2001 | Palmatier et al. ........ 101/401.1 |
| 6,284,103 B1 | 9/2001 | Eng et al. |
| 6,375,602 B1 | 4/2002 | Jones |
| 6,409,645 B1 | 6/2002 | Paasonen et al. |
| 6,539,999 B2 * | 4/2003 | Polzin et al. ............... 156/425 |
| 6,615,721 B1 * | 9/2003 | Vrotacoe et al. ............ 101/375 |

FOREIGN PATENT DOCUMENTS

| | | |
|---|---|---|
| DE | 4007141 | 4/1991 |
| DE | 199 20 133 | 11/2000 |
| EP | 0 970 797 | 1/2000 |
| JP | 59 076212 | 5/1984 |
| JP | 61-171913 | 8/1986 |
| JP | 61-258794 | 11/1986 |
| JP | 2-259186 | 10/1990 |
| JP | 5-259186 | 4/1993 |
| JP | 6-58324 | 3/1994 |
| WO | WO 94/09208 | 4/1994 |
| WO | WO 95/17298 | 6/1995 |
| WO | WO 96/31342 | 10/1996 |
| WO | WO 97/38162 | 10/1997 |
| WO | WO 01/53787 | 7/2001 |

OTHER PUBLICATIONS

Paasonen; *The Role of Composite Roll Covers in Soft and Super Calendering*, 46$^{th}$ Congress Annual ATIP, Grenoble, Oct. 20-22, 1993, pp. 1-13.

PCT International Search Report PCT/US03/18895.

International Search Report for PCT/US2004/007085.

* cited by examiner

METHOD FOR FORMING COVER FOR INDUSTRIAL ROLL

FIELD OF THE INVENTION

The present invention relates generally to covers for industrial rolls, and more particularly to methods of forming covers for industrial rolls.

BACKGROUND OF THE INVENTION

In a typical papermaking process, a water slurry, or suspension, of cellulosic fibers (known as the paper "stock") is fed onto the top of the upper run of an endless belt of woven wire and/or synthetic material that travels between two or more rolls. The belt, often referred to as a "forming fabric," provides a papermaking surface on the upper surface of its upper run which operates as a filter to separate the cellulosic fibers of the paper stock from the aqueous medium, thereby forming a wet paper web. The aqueous medium drains through mesh openings of the forming fabric, known as drainage holes, by gravity or vacuum located on the lower surface of the upper run (i.e., the "machine side") of the fabric.

After leaving the forming section, the paper web is transferred to a press section of the paper machine, where it is passed through the nips of one or more presses (often roller presses) covered with another fabric, typically referred to as a "press felt." Pressure from the presses removes additional moisture from the web; the moisture removal is often enhanced by the presence of a "batt" layer of the press felt. The paper is then transferred to a dryer section for further moisture removal. After drying, the paper is ready for secondary processing and packaging.

Cylindrical rolls are typically utilized in different sections of a papermaking machine. Such rolls reside and operate in demanding environments in which they can be exposed to high dynamic loads and temperatures and aggressive or corrosive chemical agents. As an example, in a typical paper mill, rolls are used not only for transporting the fibrous web sheet between processing stations, but also, in the case of press section and calender rolls, for processing the web sheet itself into paper.

Typically rolls used in papermaking are constructed with the location within the papermaking machine in mind, as rolls residing in different positions within the papermaking machines are required to perform different functions. Because papermaking rolls can have many different performance demands, and because replacing an entire metallic roll can be quite expensive, many papermaking rolls include a polymeric cover that surrounds the circumferential surface of a typically metallic core. By varying the material employed in the cover, the cover designer can provide the roll with different performance characteristics as the papermaking application demands. Also, repairing, regrinding or replacing a cover over a metallic roll can be considerably less expensive than the replacement of an entire metallic roll. Exemplary polymeric materials for covers include natural rubber, synthetic rubbers such as neoprene, styrene-butadiene (SBR), nitrile rubber, chlorosulfonated polyethylene ("CSPE"— also known under the trade name HYPALON® from DuPont), EDPM (the name given to an ethylene-propylene terpolymer formed of ethylene-propylene diene monomer), polyurethane, thermoset composites, and thermoplastic composites.

In many instances, the roll cover will include at least two distinct layers: a base layer that overlies the core and provides a bond thereto; and a topstock layer that overlies and bonds to the base layer and serves the outer surface of the roll (some rolls will also include an intermediate "tie-in" layer sandwiched by the base and top stock layers). The layers for these materials are typically selected to provide the cover with a prescribed set of physical properties for operation. These can include the requisite strength, elastic modulus, and resistance to elevated temperature, water and harsh chemicals to withstand the papermaking environment. In addition, covers are typically designed to have a predetermined surface hardness that is appropriate for the process they are to perform, and they typically require that the paper sheet "release" from the cover without damage to the paper sheet. Also, in order to be economical, the cover should be abrasion- and wear-resistant.

Many covers are formed in a rotational casting operation. In a typical rotational casting process (exemplified in FIGS. 1 and 2), a metallic core 10 is positioned horizontally in a rotating fixture that supports the core 10 at one or both ends. A casting nozzle 12 is mounted, either directly to the rotating fixture or separately (for example, on a moving cart or carriage), so that it can move along the longitudinal axis of the roll.

Figure 1:
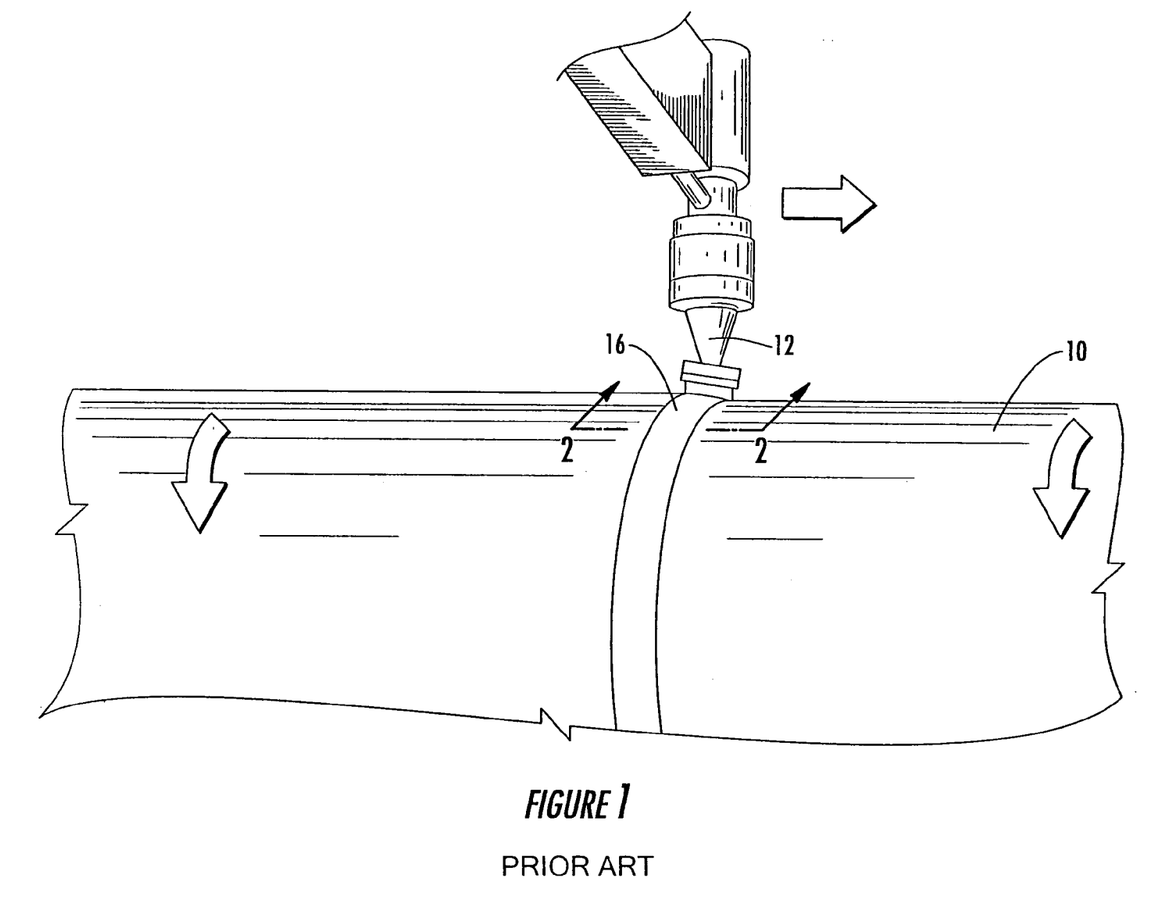
FIG. 1 is a partial perspective view of a prior art casting process with a single outlet nozzle.
Figure 2:
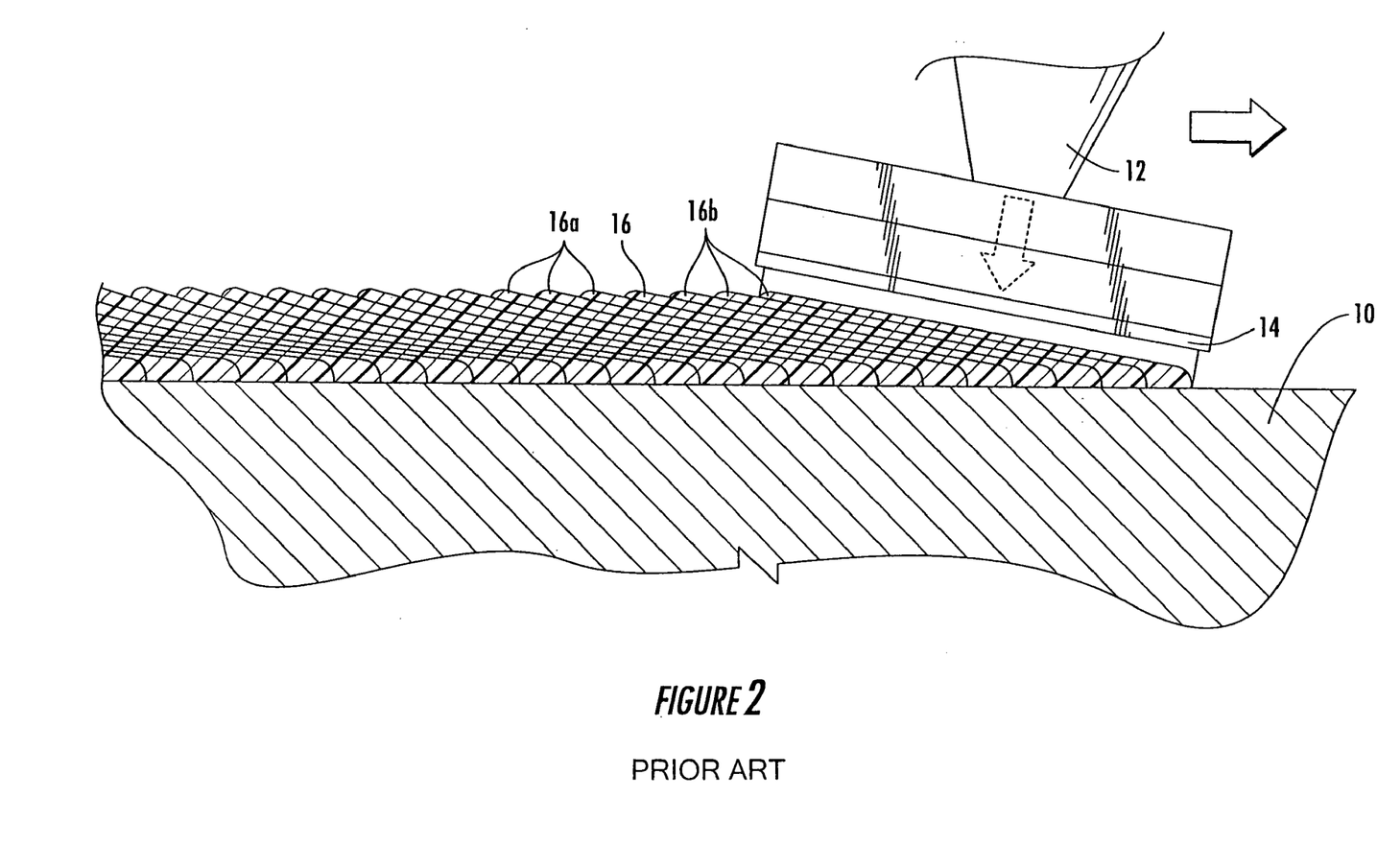
FIG. 2 is an enlarged partial section view of the core, cover and casting nozzle of FIG. 1 taken along lines 2—2 thereof.

As the casting process commences, the nozzle 12 is positioned above one end of the core 10. The nozzle 12 is continuously supplied with molten polymer 14. As the fixture rotates the core 10 about its longitudinal axis, the nozzle 12 applies a strip 16 of polymeric material to the core 10. As the core 10 rotates, the nozzle 12 translates slowly along the longitudinal axis of the core 10. Typically, the rotational speed of the core 10 and the translation rate of the nozzle 12 are such that, as the core 10 rotates past a specific circumferential location, the nozzle 12 has moved longitudinally a distance that is less than the width of the polymeric strip 16 it is applying. Consequently, each portion of a strip 16 being applied overlies portions of the strips 16a that are applied immediately preceding its application and underlies portions of strips 16b that are applied immediately after its application (see FIG. 2). Because the strips 16 are still molten as they contact each other, bonding can occur between the strips 16 to improve the integrity of the cover. Typically, a portion of a strip 16 will partially overlie portions of between two and seven other strips depending on the material being applied and its thickness. The aforedescribed process is equally applicable for all layers of a cover (i.e., for the tie-in or top stock layers, the "core" described above comprises the metallic core of the roll and the base and/or tie-in layers that surround it).

Although the process described above may be adequate for the formation of many covers, it does have at least one potential shortcoming for thick covers, or for thick layers of covers. The polymeric material applied to the core is molten, and is, therefore, somewhat malleable under load (even just the weight of subsequent overlapping layers of polymeric material) until it cures and hardens. The rate of curing for a strip of polymeric material is typically highly dependent on the thickness of the material. As such, when a relatively thick strip of polymeric material is applied to a core, its weight can cause the polymeric strips that were just applied (i.e., those that it partially overlies) to sag under the load. This tendency is exacerbated by the thickness of the underlying polymeric material, which can cause the underlying material to harden more slowly than a thinner strip would. As a result, there tends to be a practical thickness limit for the casting of some materials.

One approach to forming thicker covers is to maintain a viable thickness in the strips but to increase the extent of the overlap between adjacent layers. In this manner, the underlying layers can harden quickly, but the ultimate thickness of the entire cover or layer is greater. However, this approach results in a substantial increase in casting time.

The foregoing demonstrates that different approaches to the formation of covers for industrial rolls are still needed.

SUMMARY OF THE INVENTION

The present invention can provide, as a first aspect, a process for forming a cover for an industrial roll. The process includes the steps of: providing an elongate cylindrical core having a longitudinal axis; rotating the core about the longitudinal axis; providing a nozzle movable along a nozzle path that is substantially parallel to and above the core longitudinal axis, the nozzle having at least an upstream outlet and a downstream outlet, the nozzle outlets being longitudinally offset a distance from each other; and applying multiple strips of polymeric material to the core through the nozzle outlets as the nozzle moves along the nozzle path such that the downstream strip forms an overlapping spiral inner layer and the upstream strip forms an overlapping spiral outer layer that overlies the inner layer, the inner and outer layers being adhered with the core. This process can enable the production of a thicker layer on a roll cover than may be achievable with the application of a single layer of polymeric material.

As a second aspect, the present invention is directed to a process for forming a cover for an industrial roll, comprising the steps of: providing an elongate cylindrical core having a longitudinal axis; rotating the core about the longitudinal axis; applying a downstream strip of a polymeric material to the core such that the downstream strip forms an overlapping spiral inner layer; and then applying an upstream strip of the polymeric material over the inner layer such that the upstream strip forms an overlapping spiral outer layer that overlies the inner layer. The upstream strip is applied sufficiently proximate in time to the application of the downstream strip that the downstream strip is molten and bondable to the upstream strip, but sufficiently distant in time that the downstream strip has sufficiently cured to avoid substantial sagging, the inner and outer layers being adhered with the core. Like the process described earlier, this process can enable the production of a thicker layer on a roll cover than may be achievable with the application of a single layer of polymeric material.

As a third aspect, the present invention is directed to an industrial roll comprising: a metallic core; a polymeric base layer that is adhered to and overlies the core; and a top stock layer that overlies the base layer. The top stock layer comprises: a substantially cylindrical inner layer, the inner layer being formed of a spirally wound, overlapping strip of a first polymeric material; and a substantially cylindrical outer layer that circumferentially overlies the inner layer, the outer layer being formed of a spirally wound, overlapping strip of the first polymeric material. The top stock layer may be bonded directly to the base layer or to an intermediate tie-in layer that overlies the base layer.

DETAILED DESCRIPTION OF EMBODIMENTS OF THE INVENTION

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout, and thicknesses and dimensions of some components or features may be exaggerated for clarity.

Figure 3:
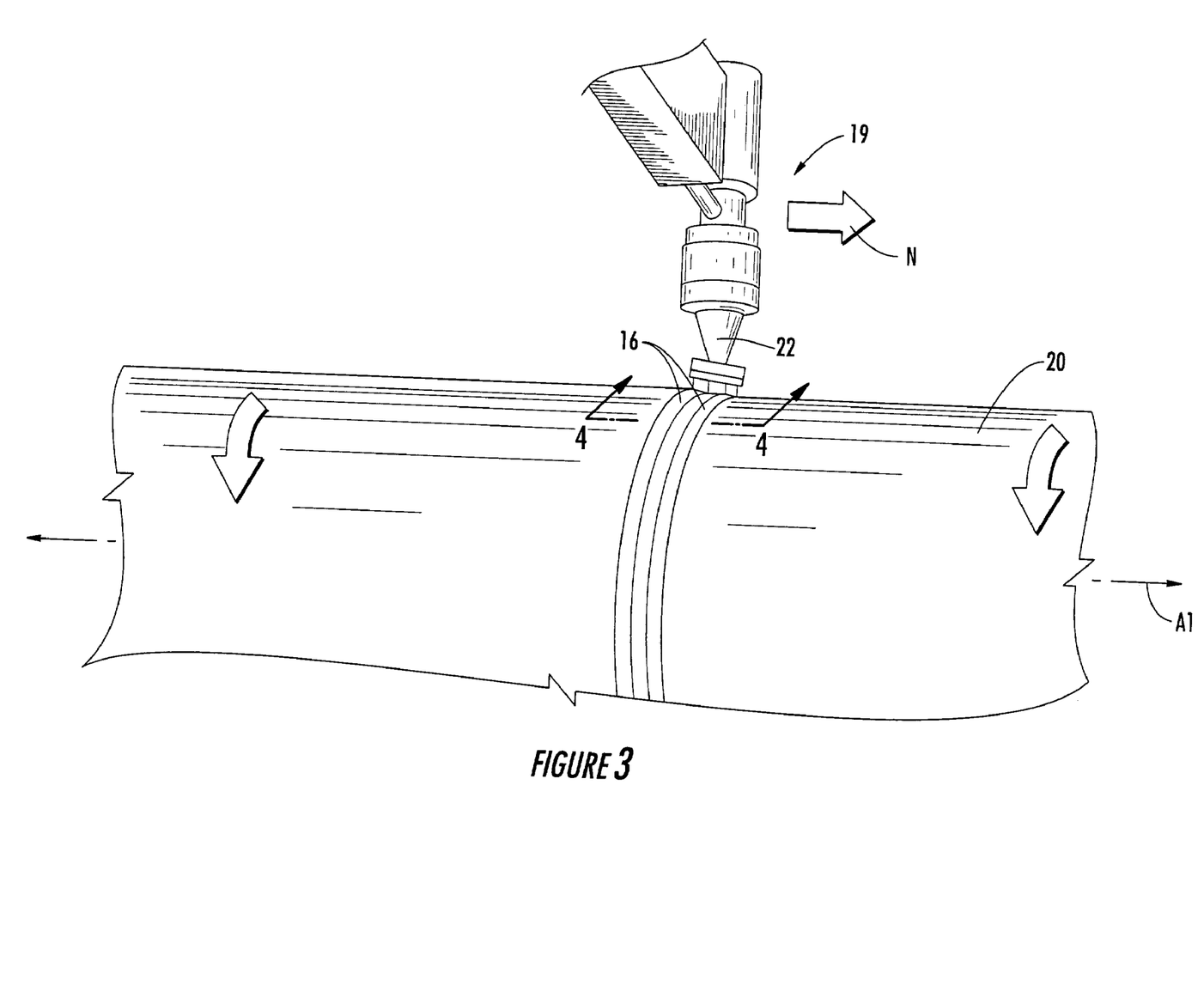
FIG. 3 is a partial perspective view of a casting system with a multiple-outlet casting nozzle for carrying out one embodiment of a process of the present invention.
Figure 4:
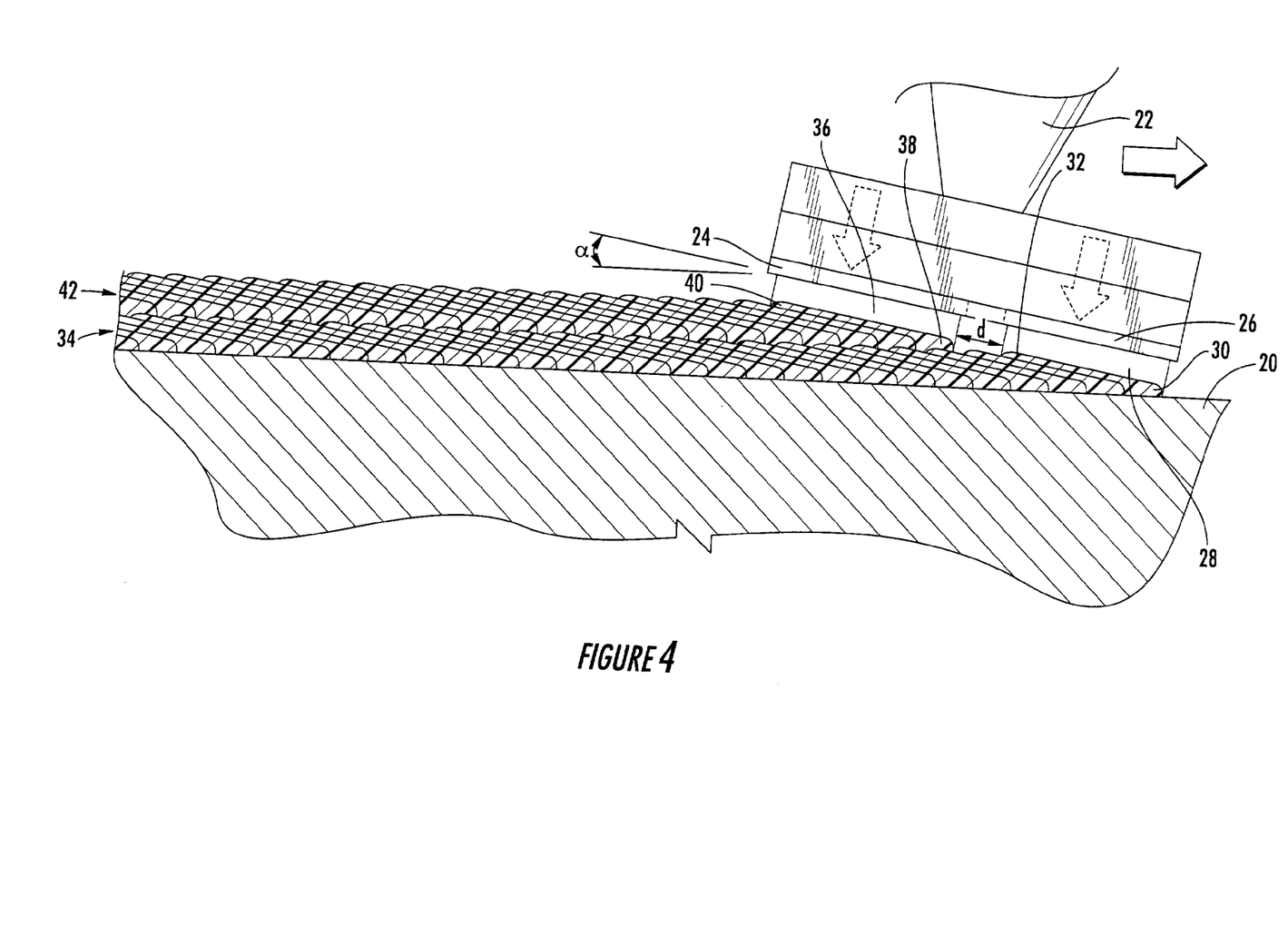
FIG. 4 is an enlarged partial section view of the core, cover and casting nozzle of FIG. 3 taken along lines 4—4 thereof.

Referring now to the figures, a casting system, designated broadly at 19, is illustrated in FIGS. 3 and 4. The casting system 19 includes a core 20 and a multi-outlet nozzle 22. The core 20, which can comprise a roll core by itself (the core typically being formed of metal and optionally having its surface treated with an adhesive or other material) or a roll core in conjunction with one or more overlying layers of polymeric material of the overall cover that underlies the layer to be added with the casting system 19 (as is described in connection with FIG. 5), is elongate, substantially cylindrical and horizontally disposed, and is mounted on a fixture (not shown) that rotates the core 20 about its longitudinal axis A1. The configuration of the fixture that rotates the core 20 about the longitudinal axis A1 can be any known to those skilled in this art for doing so and need not be described in detail herein.

Referring again to FIGS. 3 and 4, the nozzle 22 is in fluid communication with a source of molten polymeric material (not shown) and is movable along a nozzle path N that is substantially parallel to and above the longitudinal axis A1. The configuration of the apparatus for translating the nozzle 22 along the path N can be any known to those skilled in this art for inducing such movement and need not be described in detail herein.

The nozzle 22 includes two separate outlets for polymeric material: an upstream outlet 24 and a downstream outlet 26 that is longitudinally offset from the upstream outlet 24.

As used herein, the terms "upstream" and "downstream" refer to opposing directions that are parallel with the longitudinal axis A1 and the nozzle path N, with the "downstream" direction referring to the direction that the nozzle 22 moves while dispensing polymeric material and the "upstream" direction referring to the direction opposite the "downstream" direction. The upstream outlet 24 continuously dispenses an upstream strip 36 of polymeric material, and the downstream outlet 26 continuously dispenses a downstream strip 28 of polymeric material. The upstream and downstream strips 36, 28 take the cross-sectional form of, respectively, the upstream and downstream outlets 24, 26, which are typically substantially rectangular and/or oblong.

As can be seen in FIG. 4, illustratively and preferably the upstream and downstream outlets 24, 26 are inclined relative to the nozzle path N at an angle α that is typically between about 1 and 13 degrees. Also, there is an offset distance d between the leading edge of the upstream outlet 24 and the downstream outlet 26 that is typically between about 0.5 and 7 inches, which distance is also approximately equal to the distance between the upstream and downstream strips 36, 28 during processing. The outlets 24, 26 may be configured to apply strips of polymeric material of similar width and thickness or of differing width and/or thickness; a thickness of between about 0.01 and 3 inches is typical.

In operation, as is illustrated in FIGS. 3 and 4, the core 20 is rotated about the longitudinal axis A1. The nozzle 22 begins at one end of the core 20. Polymeric material is applied to the core 20 as the upstream and downstream strips 36, 28 flow through the upstream and downstream nozzles 24, 26 simultaneously and continuously. As polymeric material is applied, the nozzle 22 translates slowly along the nozzle path N. The translation distance of the nozzle 22 during one revolution of the core 20 is less than the width of the upstream and downstream strips 36, 28, such that each of the upstream and downstream strips 36, 28 spirally winds onto the core 20 in overlapping fashion separated from each other by the offset distance d. In other words, as the core 20 rotates through an entire revolution, the portion of the downstream strip 28 being applied partially overlaps multiple preceding portions of the downstream strip 28, with the leading edge 30 of the downstream strip 28 contacting the core 20 and the lagging edge 32 being positioned downstream of the lagging edge of the previously applied portion of the downstream strip 28. Similarly, the portion of the upstream strip 36 being applied partially overlaps multiple preceding portions of the upstream strip 36, with the leading edge 38 of the upstream strip 36 contacting previously-applied portions of the downstream strip 28 and the lagging edge 40 being positioned downstream of the lagging edge of the previously applied portion of the upstream strip 28. The overlapping portions of the downstream strip 28 combine to form an inner layer 34, and the overlapping portions of the upstream strip 36 combine to form an outer layer 42.

The polymeric material being applied can be any known to those skilled in this art to be suitable for the production of roll covers; as examples, natural rubber; styrene-butadiene (SBR); nitrile rubber, chlorosulfonated polyethylene; EDPM; polyester; and polyurethane may be employed, with polyurethane being preferred. The polymeric material may contain additives and fillers that can modify or enhance its physical properties and manufacturing characteristics. Exemplary materials, additives and fillers are set forth in U.S. Pat. No. 6, 328,681 to Stephens, the disclosure of which is hereby incorporated herein in its entirety. The polymeric material should be applied at a temperature that enables the material to flow from the nozzle 22 onto the core 20 and to bond thereto.

In some embodiments, one or more of the translation rate of the nozzle 22, the rotational speed of the core 20, and/or the offset distance d between the outlets 24, 26 are selected such that, as the downstream strip 28 is applied, portions of the downstream strip 28 underlying the portion of the downstream strip 28 being applied are sufficiently hardened so as to resist substantial sagging. Also, one or more of these parameters may be selected so that, as the upstream strip 36 is being applied over the downstream strip 28, portions of the downstream strip 28 underlying the portion of the upstream strip 36 being applied are sufficiently hardened so as to resist substantial sagging. Thus, the inner and outer layers 34, 42 formed from the upstream and downstream strips 36, 28 can maintain their shape during casting, with the result that an increased total thickness of the inner and outer layers 34, 42 can be achieved compared to the thickness of a layer applied with a single nozzle in a single pass.

Those skilled in this art will recognize that, although the use of the multi-outlet nozzle 22 is preferred, embodiments of the invention may be performed with two separate nozzles.

If multiple nozzles are employed, the upstream and downstream strips they apply may be applied substantially simultaneously or not, but should be applied sufficiently proximate in time that the downstream strip is still molten and bondable to the upstream strip. It should also be apparent to those skilled in this art that more than two nozzles and/or nozzle outlets may be employed to apply more than two strips of polymeric material.

Figures 5, 5A:
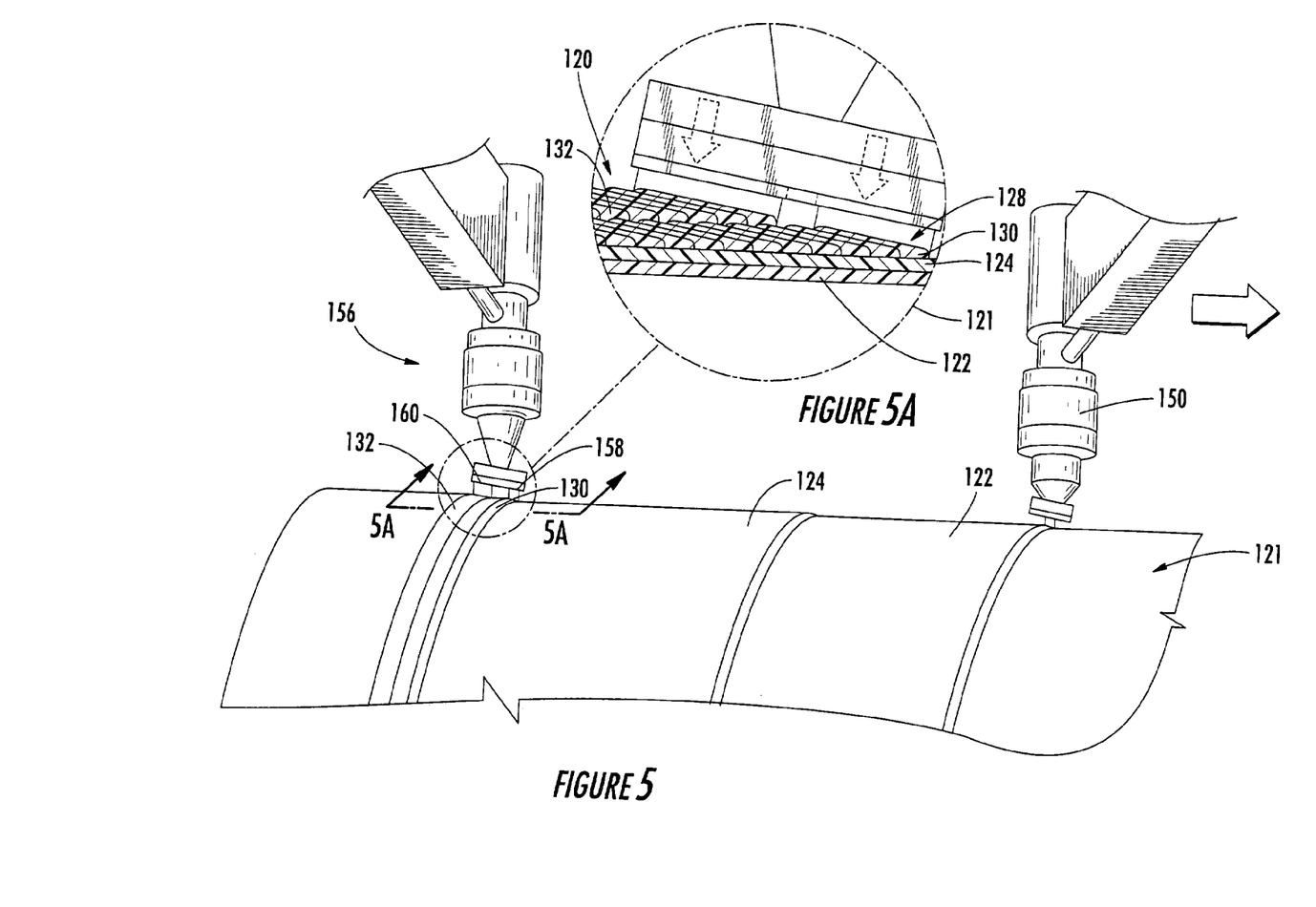
FIG. 5 is a perspective view of an alternative casting system for carrying out another embodiment of a process of the present invention.
FIG. 5A is a greatly enlarged section view of the core, cover and casting nozzle of FIG. 5 taken along lines 5A—5A.

An additional embodiment of an industrial roll cover, designated broadly at 120, is illustrated in FIGS. 5 and 5A. The cover 120 includes a base layer 122, a tie-in layer 124, and a top stock layer 128 that comprises an inner layer 130 and an outer layer 132. In the illustrated embodiment, the base layer 122 circumferentially surrounds the core 121 and extends radially outwardly therefrom about 0.010 to 0.250 inches. The tie-in layer 124 circumferentially surrounds the base layer 122 and extends radially outwardly therefrom approximately 0.010 to 0.250 inches. Suitable materials and construction for the base and tie-in layers 122, 124 are discussed in U.S. Pat. No. 6,328,681, supra. The top stock layer 128 covers and adheres to the tie-in layer 124 and provides adequate thickness (typically between about 0.2 and 2.0 inches) for further finishing operations. A top stock layer 128 may be between about 6 and 72 inches in diameter and 50 and 400 inches in length. The hardness of the cured top stock layer 128 is typically between about 2 and 400 on the Pusey and Jones (P&J) hardness scale.

Referring to FIGS. 5 and 5A, the cover 120 can be prepared in the following manner. After the preparation of the core 121, the base and tie-in layers 122, 124 are applied with a casting nozzle such as that designated at 150 in FIG. 5. During application, the nozzle 150 begins at one end of the core 121 and moves axially on a track (not shown) as the core 121 rotates about its axis; in this manner, the core 121 becomes coated with the base layer 122, and the tie-in layer 124 covers the base layer 122.

Referring still to FIGS. 5 and 5A, the top stock layer 128 is applied after application of the tie-in layer 124 (preferably while the tie-in layer 124 is still semi-soft) with a multi-outlet nozzle 156. The nozzle 156 applies the inner layer 130 of the top stock layer 128 through an outlet 158 (typically at a thickness of between about 0.010 and 3.0 inches), and simultaneously, through an outlet 160, applies the outer layer 132 of the top stock layer 128 upstream of the portion of the inner layer 130 that is being applied (typically at a thickness of between about 0.010 and 3.0 inches). Thus, as illustrated in FIG. 5A, several revolutions of the core 121 occur before the outer layer 132 is applied over the inner layer 130 at a given axial location. The process as described can achieve many of the performance advantages described above.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A process for forming a cover for an industrial roll, comprising the steps of:
providing an elongate cylindrical core having a longitudinal axis;
rotating the core about the longitudinal axis;
providing a nozzle movable along a nozzle path that is substantially parallel to and above the core longitudinal axis, the nozzle having at least an upstream outlet and a downstream outlet, the nozzle outlets being longitudinally offset a distance from each other; and
applying multiple strips of polymeric material to the core through the nozzle outlets as the nozzle moves along the nozzle path such that the downstream strip forms an overlapping spiral inner layer and the upstream strip forms an overlapping spiral outer layer that overlies the inner layer, the inner and outer layers being adhered with the core.

2. The process defined in claim 1, wherein each of the upstream strip and the downstream strip includes leading and lagging edges, and wherein the lagging edge of the downstream strip is positioned downstream of the leading edge of the upstream strip during the applying step.

3. The process defined in claim 2, wherein at least one of the polymeric material, the temperature of the polymeric material, the rotational speed of the core, and the offset distance of the nozzle outlets is selected such that, as the downstream strip is applied, previously-applied portions of the downstream strip underlying a portion of the downstream strip being applied are sufficiently cured so as to resist substantial sagging.

4. The process defined in claim 3, wherein the at least one of the polymeric material, the temperature of the polymeric material, the rotational speed of the core, and the offset distance of the nozzle outlets is selected such that, as the upstream strip is applied, portions of the inner layer underlying a portion of the upstream strip being applied are sufficiently cured so as to resist substantial sagging.

5. The process defined in claim 1, wherein the polymeric material is selected from the group consisting of: natural rubber; SBR; nitrile rubber, chlorosulfonated polyethylene; EDPM; and polyurethane.

6. The process defined in claim 1, wherein the thickness of the upstream strip is between about 0.010 and 3.0 inches.

7. The process defined in claim 1, wherein the thickness of the downstream strip is between about 0.010 and 3.0 inches.

8. The process defined in claim 7, wherein the thickness of the upstream strip is between about 0.010 and 3.0 inches.

9. The process defined in claim 2, wherein the leading edge of the downstream strip is positioned between about 0.5 and 7 inches from the lagging edge of the upstream strip as each are being applied.

10. The process defined in claim 1, wherein the core comprises a metallic member adhered to a polymeric base layer for the cover, the base layer bonding with the inner layer.

11. The process defined in claim 10, wherein the inner and outer layers together comprise a top stock layer.

12. The process defined in claim 11, wherein the inner layer directly overlies one of the base layer and an intervening tie-in layer.

13. The process defined in claim 1, wherein the outer layer has a cured hardness of between about 2 and 400 on the Pusey and Jones scale.

14. A process for forming a cover for an industrial roll, comprising the steps of:
providing an elongate cylindrical core having a longitudinal axis;
rotating the core about the longitudinal axis;
applying a downstream strip of a polymeric material to the core such that the downstream strip forms an overlapping spiral inner layer; and then
applying an upstream strip of the polymeric material over the inner layer such that the upstream strip forms an overlapping spiral outer layer that overlies the inner layer;
wherein the upstream strip is applied sufficiently proximate in time to the application of the downstream strip that the downstream strip is molten and bondable to the upstream strip, but sufficiently distant in time that the downstream strip has sufficiently cured to avoid substantial sagging, the inner and outer layers being adhered with the core.

15. The process defined in claim 14, wherein the steps of applying the upstream and downstream strips are performed substantially simultaneously at different axial locations on the core.

16. The process defined in claim 15, wherein the steps of applying the upstream and downstream strips are performed with a single application nozzle having upstream and downstream nozzle outlets.

17. The process defined in claim 14, wherein the polymeric material is selected from the group consisting of: natural rubber; SBR; nitrile rubber, chlorosulfonated polyethylene; EDPM; and polyurethane.

18. The process defined in claim 14, wherein the thickness of the upstream strip is between about 0.010 and 3.0 inches.

19. The process defined in claim 14, wherein the thickness of the downstream strip is between about 0.010 and 3.0 inches.

20. The process defined in claim 14, wherein the core comprises a metallic member adhered to a polymeric base layer for the cover, the base layer bonding with the inner layer.

21. The process defined in claim 20, wherein the inner and outer layers together comprise a top stock layer.

22. The process defined in claim 21, wherein the inner layer directly overlies one of the base layer and an intervening tie-in layer.

23. The process defined in claim 14, wherein the outer layer has a cured hardness of between about 2 and 400 on the Pusey and Jones scale.

* * * * *

UNITED STATES PATENT AND TRADEMARK OFFICE
CERTIFICATE OF CORRECTION

PATENT NO. : 6,874,232 B2
DATED : April 5, 2005
INVENTOR(S) : Madden et al.

It is certified that error appears in the above-identified patent and that said Letters Patent is hereby corrected as shown below:

Title page,
Item [56], References Cited, FOREIGN PATENT DOCUMENTS,
insert -- JP    5-106189    4/1993 --
delete "JP    5-259186    4/1993".

Signed and Sealed this

Eighteenth Day of October, 2005

JON W. DUDAS
*Director of the United States Patent and Trademark Office*